(12) United States Patent  (10) Patent No.: US 7,013,036 B2
Inoue  (45) Date of Patent: Mar. 14, 2006

(54) IMAGE SENSING APPARATUS AND METHOD OF CONTROLLING IMAGE SENSING

(75) Inventor: Hitoshi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 10/160,219

(22) Filed: May 30, 2002

(65) Prior Publication Data

US 2003/0021456 A1  Jan. 30, 2003

(30) Foreign Application Priority Data

May 31, 2001  (JP)  ............... 2001-165506

(51) Int. Cl.
*G06K 9/00* (2006.01)

(52) U.S. Cl. ............ 382/132; 250/208.6; 250/214 DC; 708/670

(58) Field of Classification Search ............... 708/202, 708/203, 300, 309, 317, 490, 505, 670, 805; 382/132, 312; 250/208.6, 215, 214 DC
See application file for complete search history.

(56) References Cited

U.S. PATENT DOCUMENTS

| 3,031,606 | A | | 4/1962 | Cantonwine | |
| 4,877,951 | A | * | 10/1989 | Muro | ............... 257/290 |
| 5,095,906 | A | * | 3/1992 | Ema | ............... 600/407 |
| 5,097,342 | A | * | 3/1992 | Agano | ............... 358/302 |
| 6,134,350 | A | * | 10/2000 | Beck | ............... 382/240 |
| 6,237,014 | B1 | * | 5/2001 | Freidin et al. | ............... 708/422 |

FOREIGN PATENT DOCUMENTS

JP  10-285466  10/1998
JP  2000-504516  4/2000

OTHER PUBLICATIONS

English Abstract of JP10-285466 (Item A).
English Abstract of JP2000-504516 (Item B).

* cited by examiner

*Primary Examiner*—Brian Werner
*Assistant Examiner*—Christopher Lavin
(74) *Attorney, Agent, or Firm*—Morgan & Finnegan, LLP

(57) ABSTRACT

Signals obtained from a sensor array that includes a plurality of energy transducers are processed. A converter used in this processing generates a plurality of converted signals by applying processing to signals from the energy transducers on a block by block basis, wherein the block is a sensor block comprising a prescribed number of neighboring energy transducers. The plurality of converted signals generated by the converter include a first converted signal, which includes a local mean and is generated by adding signals obtained from the sensor block, and a second converted signal, which includes difference between signals obtained from the sensor block. The converted signals produced by the converter are output simultaneously or sequentially.

10 Claims, 6 Drawing Sheets

IMAGE SENSING APPARATUS AND METHOD OF CONTROLLING IMAGE SENSING

FIELD OF THE INVENTION

This invention relates to an image processing apparatus and method. More particularly, the invention relates to an image processing apparatus and method, which are ideal for use in an X-ray photography system employed in the medical field, for rendering into an image the amount of penetrating radiation that has passed through the interior of a subject by exposing the subject to radiation.

BACKGROUND OF THE INVENTION

In a known X-ray photography system, an object, especially the interior of the object, is observed by measuring the radiation transmission distribution of the object. X-rays typically are employed as the radiation. In a system of this kind, a method that is becoming the norm involves acquiring a radiation distribution using a large-format image sensor that employs a solid-state image sensing device referred to as a flat-panel X-ray sensor.

A solid-state image sensing device is characterized by having a multiplicity of pixels on a plane and sampling a planar energy distribution spatially in direct fashion to so that the distribution can be converted to an electric signal. While this feature is an advantage of such a device, in a certain sense it is a disadvantage as well. Specifically, since the spatial distribution is sampled directly, a spatially continuous signal state in which sampling can be performed freely does not exist.

For example, when sampling something that has been converted to a video signal by a lens scanner using a conventional photo-stimulable phosphor, the fact that a spatially continuous signal exists on the photo-stimulable phosphor as a latent image means that sampling can be carried out again at any sampling pitch after X-ray photography has been performed. Similarly, in a case where an image that has been visualized on a silver-halid film is read and converted to a digital signal, there is substantial latitude in terms of the sampling pitch.

On the other hand, with a flat-panel X-ray sensor in which a radiation-dose spatial distribution that exists momentarily owing to exposure to radiation is spatially sampled directly by a plurality of pixel sensors arrayed side by side in actual space, the sampling interval is dependent upon the a predesigned sampling pitch. If it is desired to broaden the sampling pitch, an expedient of the kind described in the specification of Japanese Patent Application Laid-Open No. 10-285466, Japanese Patent No. 2000-504516 or U.S. Pat. No. 3,031,606 is employed. Specifically, a sensor having a sampling pitch finer than that usually required is designed, pixel information signals from mutually adjacent pixels on the sensor are added as electric signals and, under ordinary circumstances, the sensor is essentially handled as one having large pixels and a large pixel pitch. When finer information is required, the adding of signals is halted and information is extracted on a pixel-by-pixel basis.

However, once mutually adjacent pixels have been added and image information captured at a substantially large pixel pitch, it is impossible to generate image information from this image information at a sampling pitch finer than that of this image information. When finer information is required, therefore, it is necessary to perform photography again. In order to avoid this, image information obtained as a digital signal by sampling at a fine pitch from the start is saved, pixels are added in the form of a digital signal and image information that is essentially coarse is obtained. Since the fine image information also is saved in this case, the fine image information can be called.

With this approach, however, the amount of image information held is greater than necessary and there is the danger that the sampling rate of the image information will rise more than necessary. As a consequence, there are instances where cost rises so high as to make the above arrangement substantially impractical.

SUMMARY OF THE INVENTION

Accordingly, an object of the present invention is to reduce the amount of data and make it possible to reconstruct high-resolution image information.

According to the present invention, the foregoing object is attained by providing an image sensing apparatus comprising: a plurality of energy transducers; an arithmetic circuit for generating a plurality of converted signals by applying processing to signals from each of a prescribed number of neighboring ones of the energy transducers, the prescribed number of neighboring energy transducers constituting a unit block; and an output circuit for outputting the converted signals generated by the arithmetic circuit; wherein the plurality of energy transducers, the arithmetic circuit and the output circuit are formed on the same semiconductor substrate; and the plurality of converted signals generated by the arithmetic circuit include a first converted signal generated by adding signals obtained from the unit block, and a second converted signal that includes differences between signals obtained from the unit block.

According to another aspect of the present invention, the foregoing object is attained by providing a sensing control method for controlling an image sensing apparatus having an image sensing device formed on the same semiconductor substrate and including a plurality of energy transducers and a processing circuit for applying processing to signals from the plurality of energy transducers, the method comprising: an arithmetic step of generating a plurality of converted signals by the processing circuit by applying processing to signals from each of a prescribed number of neighboring ones of the energy transducers, the prescribed number of neighboring energy transducers constituting a unit block; and an output step of outputting the converted signals generated by the arithmetic step; wherein the plurality of converted signals generated by the arithmetic step include a first converted signal generated by adding signals obtained from the unit block, and a second converted signal that includes differences between signals obtained from the unit block.

In still another aspect of the present invention, the foregoing object is attained by providing an image processing apparatus comprising: an arithmetic circuit for performing an addition operation on signals from a plurality of neighboring energy transducers, thereby producing a sum signal, and a subtraction operation on signals from the plurality of neighboring energy transducers, thereby producing a difference signal; and a control circuit for exercising control so as to execute moving-image processing based upon the sum signal produced by the arithmetic circuit, and still-image processing based upon signals, which are obtained from each of the energy transducers, that have been reconstructed from the sum signal and difference signal produced by the arithmetic circuit.

In still another aspect of the present invention, the foregoing object is attained by providing an image processing method comprising: an arithmetic step of performing an addition operation on signals from a plurality of neighboring energy transducers, thereby producing a sum signal, and a subtraction operation on signals from the plurality of neighboring energy transducers, thereby producing a difference signal; and a control step of exercising control so as to execute moving-image processing based upon the sum signal produced by the arithmetic step, and still-image processing based upon signals, which are obtained from each of the energy transducers, that have been reconstructed from the sum signal and difference signal produced by the arithmetic step.

In the arrangement described above, the dynamic range of the second converted signal is narrower than that of the first converted signal. As a result, the number of bits used in digitizing the second converted signal can be reduced, thereby making it possible to reduce the amount of data.

Further, in the arrangement described above, by applying an operation that is the inverse of the above-mentioned processing, pixel values corresponding to the individual energy transducers can be obtained, thereby making it possible to reconstruct a high-resolution image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENTS

Figure 1:
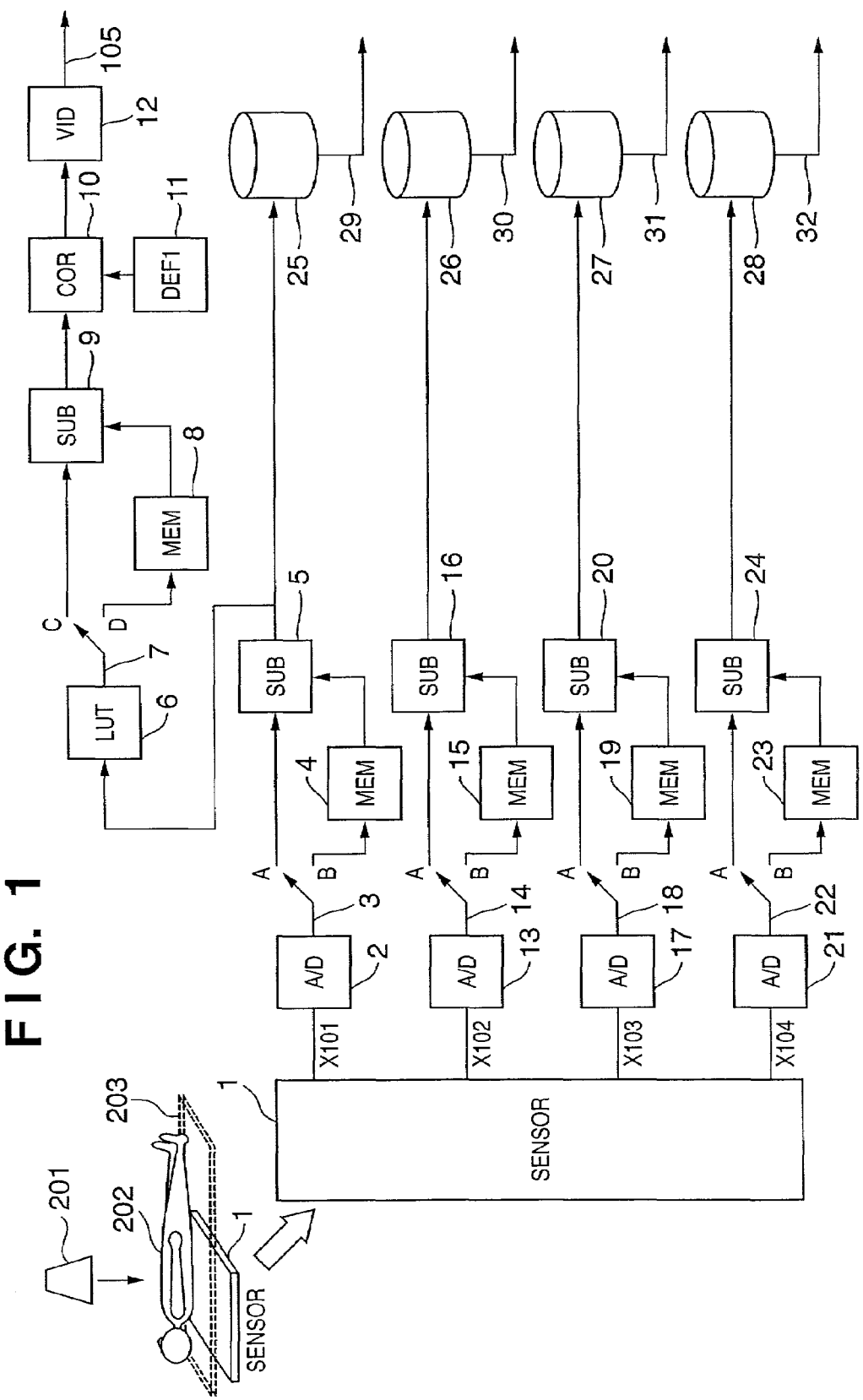
FIG. 1 is a block diagram illustrating the structure of an X-ray image acquisition apparatus according to a first embodiment of the present invention.

Preferred embodiments of the present invention will now be described in accordance with the accompanying drawings.

According to these embodiments, a summed-pixel signal and a processed-pixel signal are generated from high-definition pixel information that has been spatially sampled at a sampling rate higher than that usually required. The summed-pixel signal (which includes a local mean-value component of the high-definition pixel information) is the sum of the products of a plurality of neighboring-pixel signals in the high-definition pixel information, and the processed-pixel signal is the sum of the products (in a different form, e.g., inclusive of subtraction of pixel signals) of the plurality of pixel signals that does not include a local mean-value component of the pixel signals. High-definition pixel information can be reconstructed from the summed-pixel signal and the processed-pixel signal.

By virtue of this arrangement, a moving image sequence can be acquired by the summed-pixel signal, and a still-image signal can be acquired by a pixel-by-pixel signal reconstructed by the summed-pixel signal and processed-pixel signal.

More specifically, image information in which the basic unit is a block comprising a plurality of neighboring pixels is subjected to a wavelet transform to produce components that include a local mean-value component of the image information and components other than these components (namely components that do not include a local mean-value component). When these components are converted to digital signal values, all components generated simultaneously are converted simultaneously. If this arrangement is adopted, it will suffice if the sampling rate (clock frequency) of the analog-to-digital conversion is made a sampling frequency in which the above-mentioned block is the basic unit. This means that the sampling rate can be set to a low value. Furthermore, the components that include the local mean-value component and the components other than these are saved in parallel using different conversion precisions (numbers of bits) for converting these components to digital signals. By lowering the number of bits of the components that do not include the local mean-value component, the amount of data can be reduced while the influence on image quality is suppressed.

In order to make possible such an operation upon the analog signals, it is necessary to extract each pixel output signal of the flat-panel sensor non-destructively. "Non-destructive" means that even though a pixel signal is read out, this information remains in the sensor pixels; it is so arranged that the sensor pixel signals are not lost. In this case, the output signal usually is extracted as an electric potential. Furthermore, by using an amplifier (voltage follower), which is accompanied by an impedance conversion, in the output section, any influence on charge information that has been accumulated in pixels is reduced even though potential information is extracted.

In general, the number of bits of an analog-to-digital converter necessary for a medical image is required to be made greater than 12 to 14 bits if various corrections and dynamic range are taken into account. However, signal components that do not include the above-mentioned local mean-value component have a narrow dynamic range and therefore it is possible to use a low-cost analog-to-digital converter of 8 to 10 bits.

For example, with regard to a square flat-panel sensor each side of which is composed of n-number of pixels, a memory of $2 \times n^2$ bytes will be necessary in a case where all of the pixel information is stored in the form of two bytes (16 bits). By contrast, in a case where, e.g., 2×2 neighboring pixels are subjected to a transform using a Haar function, as in the embodiments described below, one image containing a local mean-value component and three images that do not contain local mean-value components are obtained and each constitutes image information each side of which is composed of n/2-number of pixels. Furthermore, image information containing a local mean is stored using two bytes, and components that do not contain a local mean are stored using one byte because these components have a narrow dynamic range. As a result, the amount of memory required is $2\times(n/2)^2+3\times(n/2)^2$ (where the first term relates to one 2-byte image and the second term relates to three 1-byte images). By rearranging this expression, we obtain $5\times n^2/4$. Accordingly, the amount of memory required can be reduced to 62.5% of that in the case where all images are stored using two bytes for each image.

Moreover, in most cases, the original high-definition image can be reconstructed from the compressed image. Accordingly, if, for example, it is required to examine movement of the internal organs of a patient at the medical facility by recording and observing a moving image sequence in real time using data (image information in block units) having a coarse sampling interval and then perform diagnosis with regard to a single frame of the recorded moving image sequence, components having a local mean value and components not having a local mean value can be used together to reconstitute the high-definition image.

Further, if it is possible to reconstitute the original high-definition image from the image information representing the above-mentioned four images, then a high-definition video signal can be observed, while suppressing the sampling rate of the A/D converter, even in real-time processing.

FIRST EMBODIMENT

FIG. 1 is a block diagram illustrating the structure of an X-ray image acquisition apparatus according to a first embodiment of the present invention.

As shown in FIG. 1, the apparatus includes an X-ray generator 201 and a bed 203 on which a patient 202 lies. The diagram shows the patient 202 lying on the bed 203 and undergoing X-ray photography. The apparatus further includes a flat-panel sensor 1. Though the details will be described later, the flat-panel sensor 1, when actuated, outputs converted-image information, which comprises four signals X101, X102, X103, X104, with regard to 1-pixel information (image information on a per-block basis). In this case, the signals X101 to X104 are converted components obtained by an orthogonal transformation. The signal X101 is a converted component that includes a local mean, and the signals X102 to X104 are converted components that do not contain a local mean.

Figure 5:
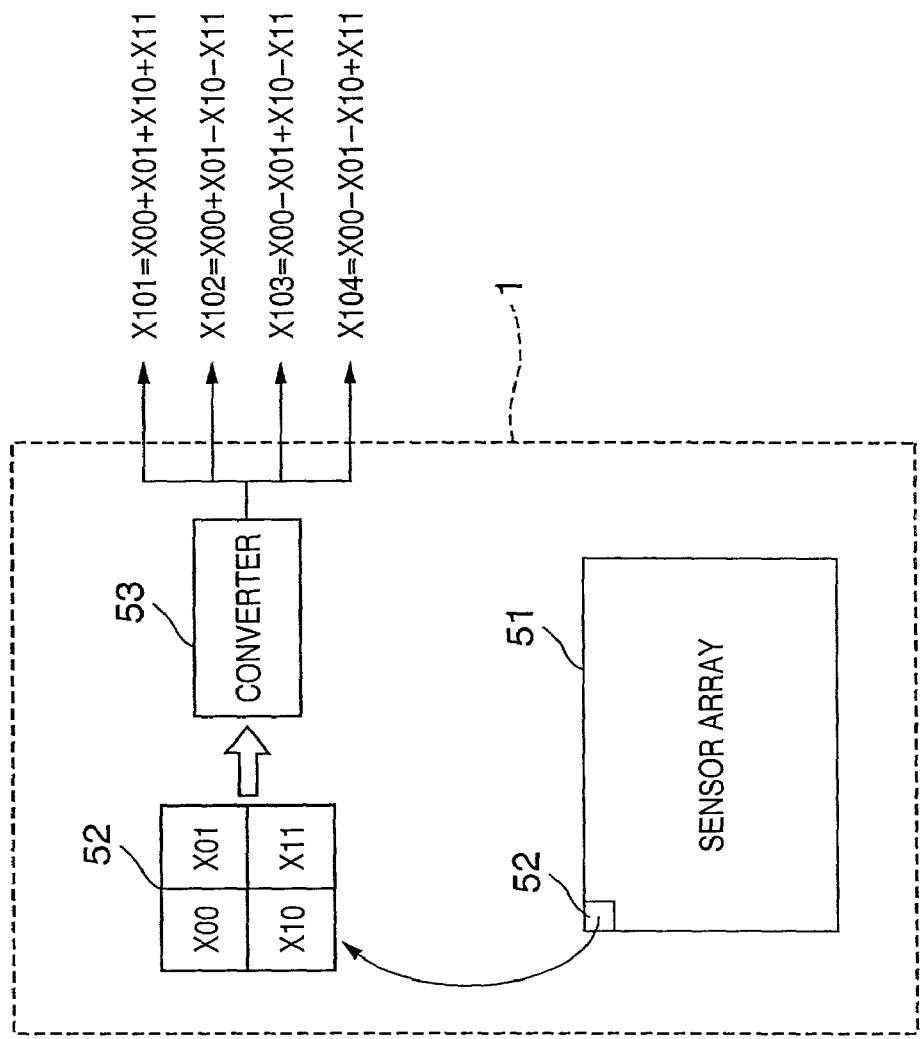
FIG. 5 is a diagram useful in describing output of converted-image information in a flat-panel sensor according to the first embodiment.

FIG. 5 is a diagram useful in describing the manner in which the above-mentioned signals are output. In a sensor array 51, a single pixel is substantially constituted by a sensor block 52 comprising four neighboring energy transducers (photoelectric transducers, referred to as "sensors" below). A converter 53 generates the four signals X101, X102, X103, X104 (converted-image information) using signals X00, X01, X10, X11 obtained from respective ones of the sensors of the sensor block 52. In FIG. 5, the sum of all of these signals from the sensors is used as the signal X101, which is a component that includes a local mean. In the conversion shown in FIG. 5, the signals are added upon multiplying all of them by the same coefficient (=1), and therefore the value obtained is proportional to the mean value (the local mean value) within the applicable block. The other signals X102, X103, X104 involve subtraction of signals (i.e., include difference values) from some of the sensors and are converted components that do not include a local mean.

With reference again to FIG. 1, A/D converters 2, 13, 17, 21 convert the signals X101, X102, X103, X104, respectively, to digital signals. The A/D converter 2 has 14-bit precision, and the A/D converters 13, 17, 21 have 8-bit precision. The converted components that do not include a local mean basically are signals that can take on a positive or negative value and have not been available heretofore. It is important that the A/D converters 13, 17, 21 be set so as to support positive and negative voltage values.

First switches 3, 14, 18, 22 switch the output destinations of the signals from the A/D converters 2, 13, 17, 21, respectively, to the A side (subtractor side) or B side (offset-memory side). Offset memories 4, 15, 19 and 23 store the signals acquired from the A/D converters 2, 13, 17 and 21, respectively. Sensor offset values (image information obtained by converting, in the manner described above, output values from sensors not being exposed to X-rays) are stored in the offset memories 4, 15, 19, 23.

Subtractors 5, 16, 20, 24 perform an offset correction by subtracting the offset values, which have been stored in the offset memories 4, 15, 19, 23, respectively, from the converted-image information acquired from the converter 53 as a result of exposure to X-rays. Filing units 25, 26, 27 and 28 store the converted-image information, from which the offsets have been eliminated, obtained from the subtractors 5, 16, 20 and 24, respectively.

A logarithmic converter 6, a second switch 7, a memory 8, a subtractor 9, a faulty-pixel correction unit 10, a memory 11 and a video signal converter 12 are for displaying a moving image using the component (X101) that contains the local mean value. The logarithmic converter 6 refers to a logarithmic-conversion reference table (LUT) to perform a logarithmic-value conversion for making a gain correction. The logarithmic conversion is for carrying out a gain correction, i.e., division by a reference image. More specifically, the logarithmic conversion is used to perform division by means of a subtraction operation. The second switch 7 changes over the destination of the output from the logarithmic converter 6. The memory 8 stores a gain-correction image that has been subjected to the logarithmic conversion by the logarithmic converter 6. The subtractor 9 uses the gain-correction image to apply a gain correction to an image obtained by subjecting the signal X101 to the logarithmic conversion.

The faulty-pixel correction unit 10 corrects the pixel value of a faulty pixel. Various methods can be used to correct a faulty pixel. For example, the pixel value of a faulty pixel may be corrected unit using the average value of pixel values of normal pixels neighboring the faulty pixel. The memory 11 stores the address of a faulty pixel. That is, the memory 11 stores the address of a pixel that does not operate in the flat-panel display. The address of the faulty pixel (namely a pixel that does not function or that exhibits no sensitivity) is stored in the memory 11 in accordance with the results of an inspection performed in advance, such as when the sensor is manufactured. The faulty-pixel correction unit 10 specifies the position of a faulty pixel (the position of the pixel to be corrected) by the address that has been stored in the memory 11 and applies the correction. The video signal converter 12 converts the image whose faulty pixel has been corrected by the faulty-pixel correction unit 10 to a video signal capable of being output and displayed on a display unit or the like.

The operation of the X-ray image acquisition apparatus according to the first embodiment constructed as set forth above will now be described.

Figure 6:
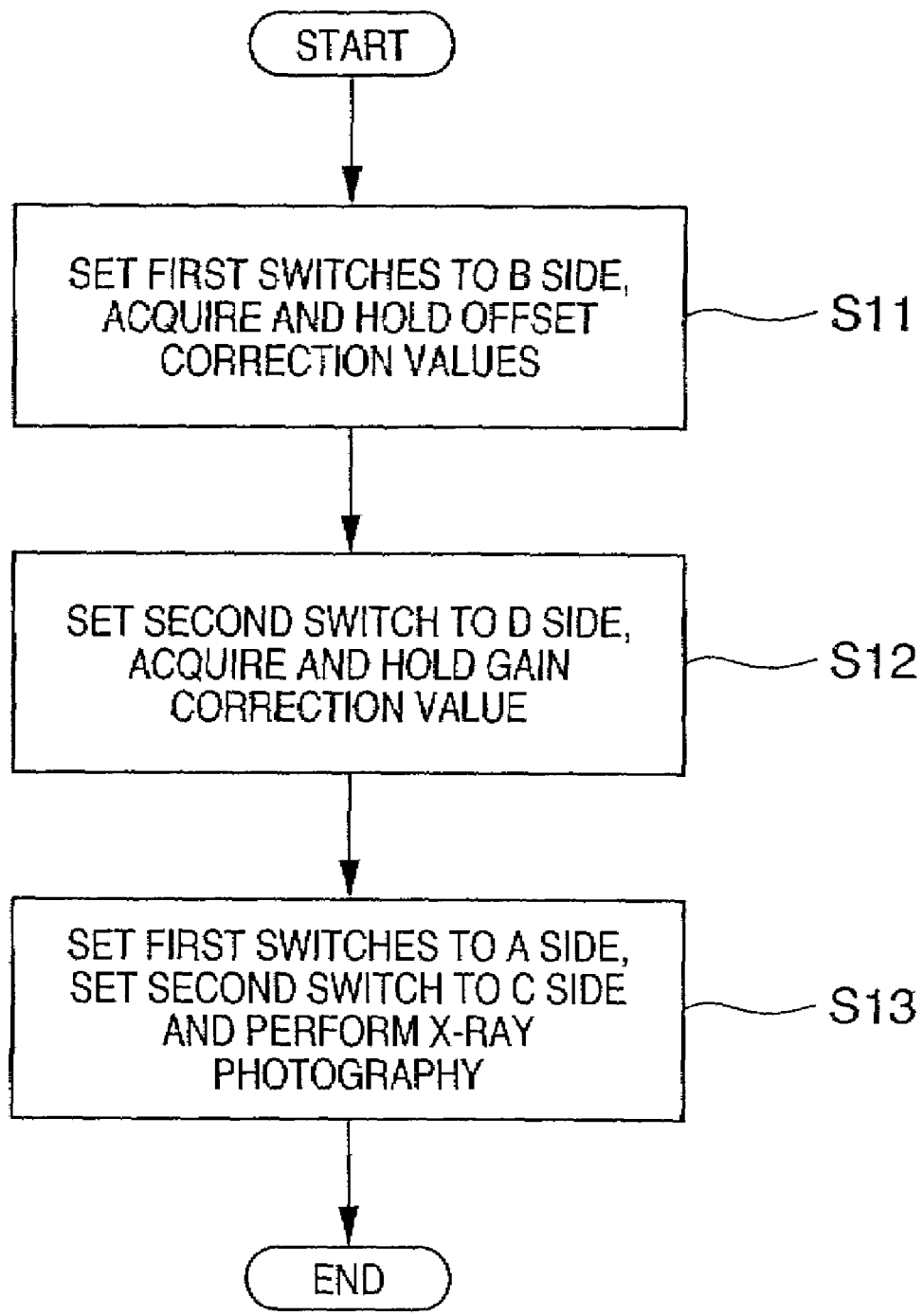
FIG. 6 is a flowchart illustrating an overview of the operation performed by the X-ray image acquisition apparatus according to the first embodiment.

FIG. 6 is a flowchart illustrating operation of the X-ray image acquisition apparatus according to the first embodiment. At step S11, an output signal from the sensor array 51, which is not being exposed to X-rays, is converted by the converter 53, whereby offset components corresponding to the converted components X101 to X104 are acquired. In this embodiment, all of the converted components X101 to X104 are subjected to offset elimination and therefore all of the switches 3, 14, 18, 22 are set to the B side and the offset values corresponding to the converted components obtained are stored in the memories 4, 15, 19, 23, respectively, as image information.

Next, at step S12, the second switch 7 is set to the D side in advance and, on the basis of image information obtained by performing X-ray exposure without the presence of a patient, a gain-correction image (an image that has undergone the logarithmic conversion) is generated based upon the signal X101 having the local mean value. The gain-correction image generated is then stored in the memory 8.

This is followed by step S13, at which control proceeds to processing for subjecting an ordinary subject to X-ray photography. In this case, all of the first switches 3, 14, 18, 22 are set to the A side so that the converted components X101, X102, X103, X104 of the X-ray photographic image obtained by the converter 53 are input to the subtractors 5, 16, 20, 24, respectively. The subtractors 5, 16, 20, 24 subtract the offset correction values, which have been stored in the offset memories 4, 15, 19, 23, respectively, from the entered X-ray photographic image, thereby removing the offsets. The converted-components that have undergone the offset correction are stored in the filing units 25 to 28 as is in order to be used in a subsequent operation for reconstituting a high-definition image.

The component that includes the local mean value undergoes subsequent signal processing because it is also used for observation purposes upon being converted to a video signal as is. At this time the second switch 7 is set to side C. The logarithmic converter 6 refers to the logarithmic-conversion reference table (LUT) with regard to the converted component X101 of the X-ray photographic image that contains the local mean value, applies a logarithmic conversion to the converted component X101 in order to carry out a gain correction, and supplies the result to the subtractor 9. The subtractor 9 subtracts the gain-correction image, which has been stored in the memory 8, from the image constituted by the converted component X101 logarithmically converted by the logarithmic converter 6, thereby applying a gain correction pixel by pixel.

Furthermore, the faulty-pixel correction unit 10 refers to the address a faulty pixel stored in the memory 11, corrects for the fault and outputs the result to the video signal converter 12. By using a circuit that includes a digital-to-analog converter, the video signal converter 12 converts the image information that has undergone the faulty-pixel correction to a video signal. Thus, a video signal is output on a signal line indicated at 105 in FIG. 1. Though not illustrated, the operator of this apparatus or a physician examining a patient using this apparatus inputs this video signal to a monitor to observe the internal structure of the patient.

It should be evident from the above description that all frames observed are recorded in the filing units 25 to 28 in concurrence with the observing operation. In this case, the filing units 25 to 28 ideally employ a RAID (Redundant Arrays of Inexpensive Disks), which is a mechanism in which a plurality of hard disks are connected together and accessed simultaneously in order to record image data at high speed.

Figure 2:
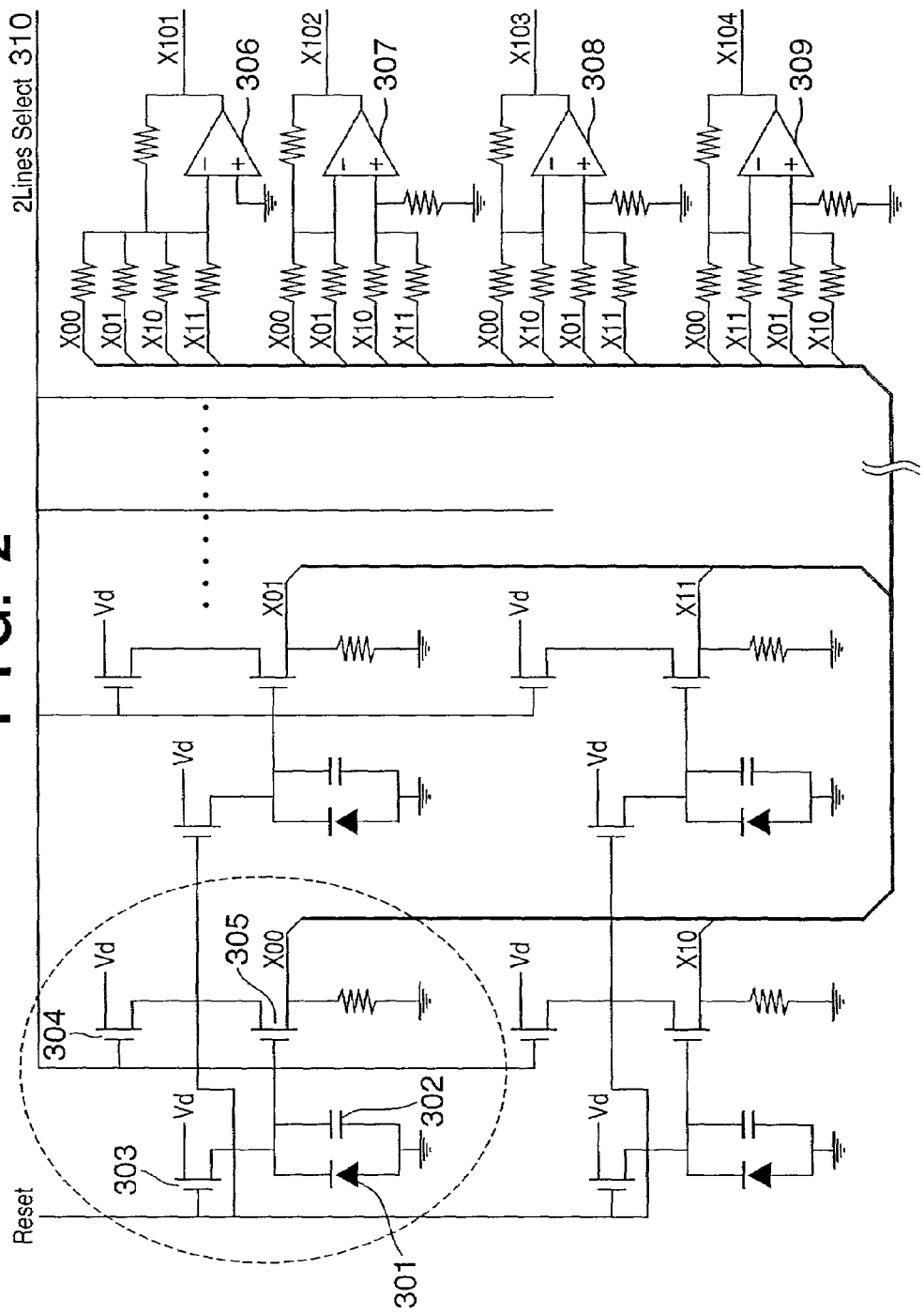
FIG. 2 is a diagram schematically illustrating the internal structure of a flat-panel sensor according to the first embodiment.

FIG. 2 is a diagram schematically illustrating the internal structure of the flat-panel sensor 1 formed on the same semiconductor substrate. Four neighboring pixels (which form a block treated substantially as one pixel) are illustrated in enlarged form. The portion in FIG. 2 enclosed by the dashed line represents one pixel (i.e., constructs one energy transducer). In the flat-panel sensor 1, a multiplicity of these blocks are arrayed two-dimensionally in the horizontal and vertical directions. A photodiode 301 converts the amount of light that impinges upon the pixel to a voltage signal by discharging electric charge, which has accumulated previously in a capacitor 302, in the form of a photoelectric current of the photodiode. A mechanism 303 forcibly charges the capacitor 302 to reset the pixel signal. All pixel signals are reset in this manner. A portion of the circuit indicated at 305 is a voltage follower that employs a FET. The voltage follower has its power source turned on and off by a switching transistor 304, whereby the output is selected.

A line select signal 310 in FIG. 2 selects two neighboring lines simultaneously. Pixel signals are output on the two selected lines, with a block formed by four neighboring pixels serving as the basis unit. This is followed by selecting the next block. In the example of FIG. 2, pixel signals of four pixels X00, X01, X10, X11 are output and input to analog arithmetic circuits 306, 307, 308, 309 having operational amplifiers. The operational amplifier 306 is an adder circuit that outputs X00+X01+X10+X11 as the output X101, as shown in FIG. 5. (Since this is an inverting amplifier circuit, signal polarity is reversed.) Similarly, the operational amplifier 307 outputs X00+X01−X10−X11 as the output X102, the operational amplifier 308 outputs X00−X01+X10−X11 as the output X103, and the operational amplifier 309 outputs X00−X01−X10+X11 as the output X104.

Thus, with the flat-panel sensor shown in FIG. 2, four operational signals X101 to X104 formed by signals output from four photodiodes contained in the same block are output in parallel form and are output sequentially block by block.

The above-described conversion operation is represented by Equation (1) below.

$$X_{out} = HX_{in}$$

where $$X_{out} \equiv \begin{bmatrix} X101 \\ X102 \\ X103 \\ X104 \end{bmatrix}, H = \begin{bmatrix} 1 & 1 & 1 & 1 \\ 1 & 1 & -1 & -1 \\ 1 & -1 & 1 & -1 \\ 1 & -1 & -1 & 1 \end{bmatrix}, X_{in} = \begin{bmatrix} X00 \\ X01 \\ X10 \\ X11 \end{bmatrix} \quad \text{(Eq. 1)}$$

The conversion indicated by Equation (1) is referred to as a Haar transform. The inverse transform is represented by the following equation:

$$X_{in} = \frac{1}{4} H X_{out} \quad \text{(Eq. 2)}$$

More specifically, the transform cited above corresponds to a wavelet transform, which is of the orthogonal transform type. Accordingly, the original pixel-signal value can be restored using Equation (2).

The outputs X101, X102, X103, X104 obtained by the conversion are input to the A/D converters 2, 13, 17, 21, respectively, of FIG. 1, and are stored in the filing units 25, 26, 27, 28, respectively, upon undergoing the offset correction in the manner described above.

In a case where these signal outputs have been selected simultaneously on two lines, the signals of the two lines are output simultaneously. All of these may be subjected to an analog-to-digital conversion simultaneously. However, in order to reduce the number of A/D converters, the signals output simultaneously can be divided into individual blocks, one A/D converter can be allocated to each of the divided signal components, and the signals can be subjected to the analog-to-digital conversion in time-division fashion using a multiplexer. For example, if one line is driven, one line (e.g., 1000 pixels) of pixel information (voltage) will appear simultaneously (i.e., 1000 voltages will be obtained). In order to apply the analog-to-digital conversion to these individually, they would be divided into blocks of 250 each, applied to a multiplexer and subjected to the analog-to-digital conversion by time-division multiplexing. In such case, four A/D converters suffice.

Further, thanks to the finer patterns that can be produced by modern semiconductor manufacturing techniques, the A/D converters can be incorporated within the sensor 1.

Reconstruction of the images that have been recorded in the filing units 25 to 28 in the manner set forth above will now be described.

Figure 3:
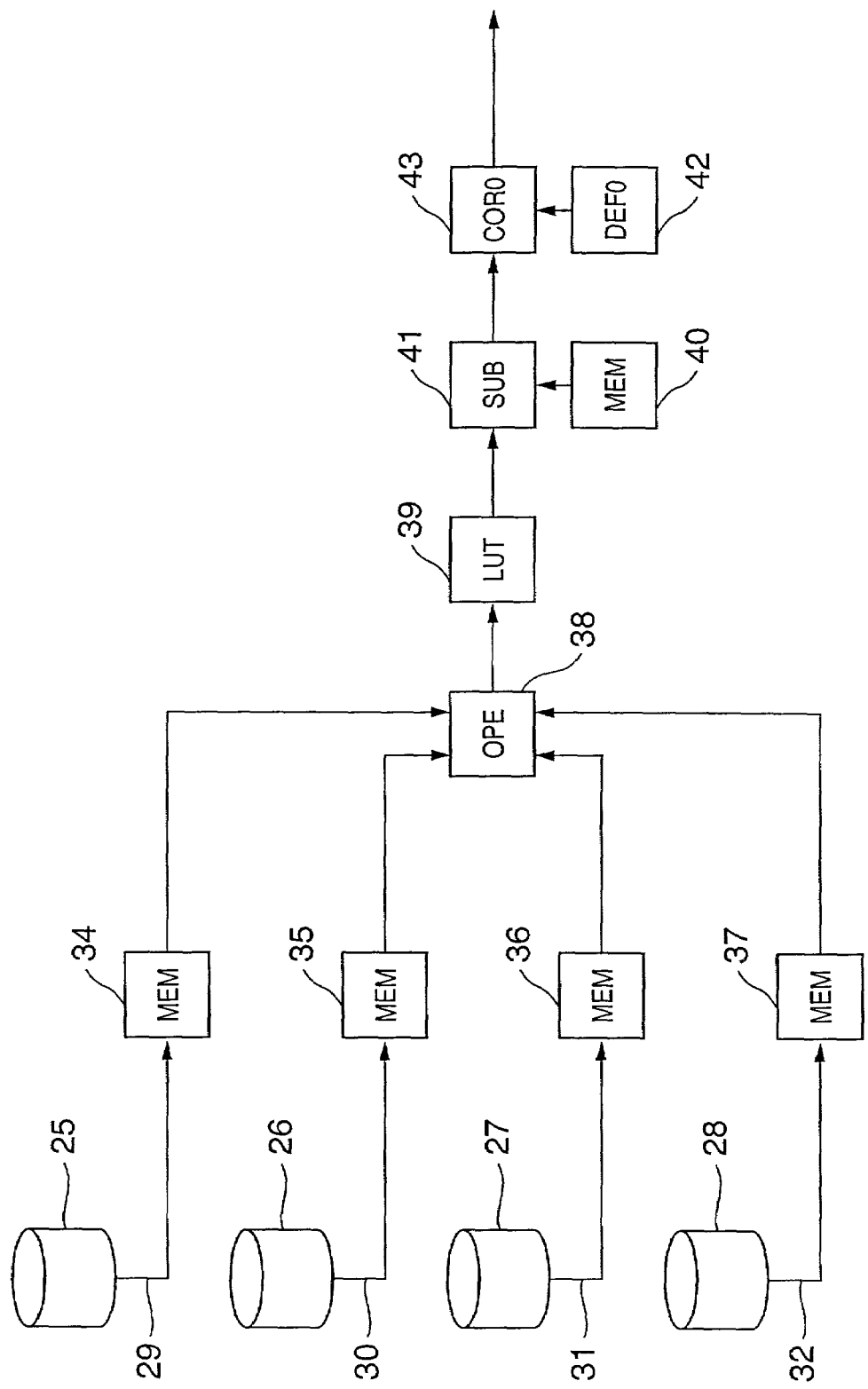
FIG. 3 is a block diagram useful in describing an operation for reconstructing a specific frame into a high-resolution image from a moving image that has been recorded in filing units.

FIG. 3 is a block diagram useful in describing an operation for restoring a specific frame to a high-resolution image from a moving image sequence that has been recorded in the filing units 25 to 28. Using a display (not shown), the operator observes a low-resolution image, which includes the local mean, stored in the filing unit 25, and selects one frame that requires more detailed study. It should be noted that observation of the image may be performed by using a real-time moving image sequence from the video signal converter 12.

In FIG. 3, image data 29 to 32 (image data formed by the converted components X101 to X104) of four low-resolution images corresponding to one selected frame is acquired and the items of image data are stored temporarily in frame memories 34 to 37, respectively. An image reconstruction operational unit 38 performs the operation represented by Equation (2) and reconstructs a high-resolution image from the data 39 to 32 representing the four low-resolution images. A logarithmic-value converter 39, which has a logarithmic-value conversion table (LUT) for performing a dividing operation in order to apply a gain correction, subjects the reconstructed high-resolution image to a logarithmic conversion.

A memory 40 stores a gain-correction image obtained by restoring a high-resolution image based upon an image that has been acquired in the absence of a subject, and subjecting the restored image to a logarithmic-value conversion. A subtractor 41 subtracts the gain-correction image, which is held in the memory 40, from the image output by the logarithmic-value converter 39.

A memory 42 stores the addresses of faulty pixels in the high-resolution image (per original pixel of the sensor). A faulty-pixel correction unit 43 corrects the faulty pixels. Specifically, with regard to the image that has undergone the gain correction, the correction unit 43 looks up faulty-pixel addresses that have been stored in the memory 32 and applies a correction to the faulty pixels. Thus, a reconstructed high-resolution image is output by the above-described arrangement.

In accordance with the first embodiment, as described above, a plurality of neighboring pixels (four pixels in this embodiment) are treated substantially as one pixel, an image corresponding to a mean value of the plurality of pixels (i.e., an image that includes a local mean value) and converted images other than this that do not include a local mean value are generated and held in memory. As a result, it will suffice to apply A/D converters using the one pixel as a basic unit, thus making it possible to lower the sampling rate. Further, with regard to an image that does not include a local mean value, the number of bits after the A/D conversion is performed can be reduced, as a result of which the amount of data can be reduced.

In the first embodiment described above, the pixels that make up the one basic pixel are four in number. However, the above technique can be applied with any number of pixels so long as the number is even. For example, a block of six (2×3) pixels may be used.

SECOND EMBODIMENT

In the first embodiment, all four pixels of information are used in the calculations performed by the adder circuits 306 to 309 of FIG. 2 (in the operation performed by the converter 52). However, it will suffice if the conversion is of the orthogonal type and it is not necessary to perform regular and inverse transforms by the same operational element (H), as represented by Equations (1) and (2).

For example, the following conversion equation can be used:

$$X_{out} = H_1 X_{in}$$

where $$X_{out} \equiv \begin{bmatrix} X101 \\ X102 \\ X103 \\ X104 \end{bmatrix}, H_1 = \begin{bmatrix} 1 & 1 & 1 & 1 \\ 1 & -1 & 0 & 0 \\ 1 & 0 & -1 & 0 \\ 1 & 0 & 0 & -1 \end{bmatrix}, X_{in} = \begin{bmatrix} X00 \\ X01 \\ X10 \\ X11 \end{bmatrix} \quad (Eq.\ 3)$$

In this case also the signals X102 to X104 do not include a local mean value and therefore the substantial dynamic range thereof is suppressed. The number of bits in the A/D conversion, therefore, is kept small. The inverse transform in this case can be implemented by using the following transformation equation:

$$X_{in} = \frac{1}{4} H_2 X_{out}$$

where $$X_{out} \equiv \begin{bmatrix} X101 \\ X102 \\ X103 \\ X104 \end{bmatrix}, H_2 = \begin{bmatrix} 1 & 1 & 1 & 1 \\ 1 & -3 & 1 & 1 \\ 1 & 1 & -3 & 1 \\ 1 & 1 & 1 & -3 \end{bmatrix}, X_{in} = \begin{bmatrix} X00 \\ X01 \\ X10 \\ X11 \end{bmatrix} \quad (Eq.\ 4)$$

In the above regular and inverse transforms, $H_1 \neq H_2$ holds.

Figure 4:
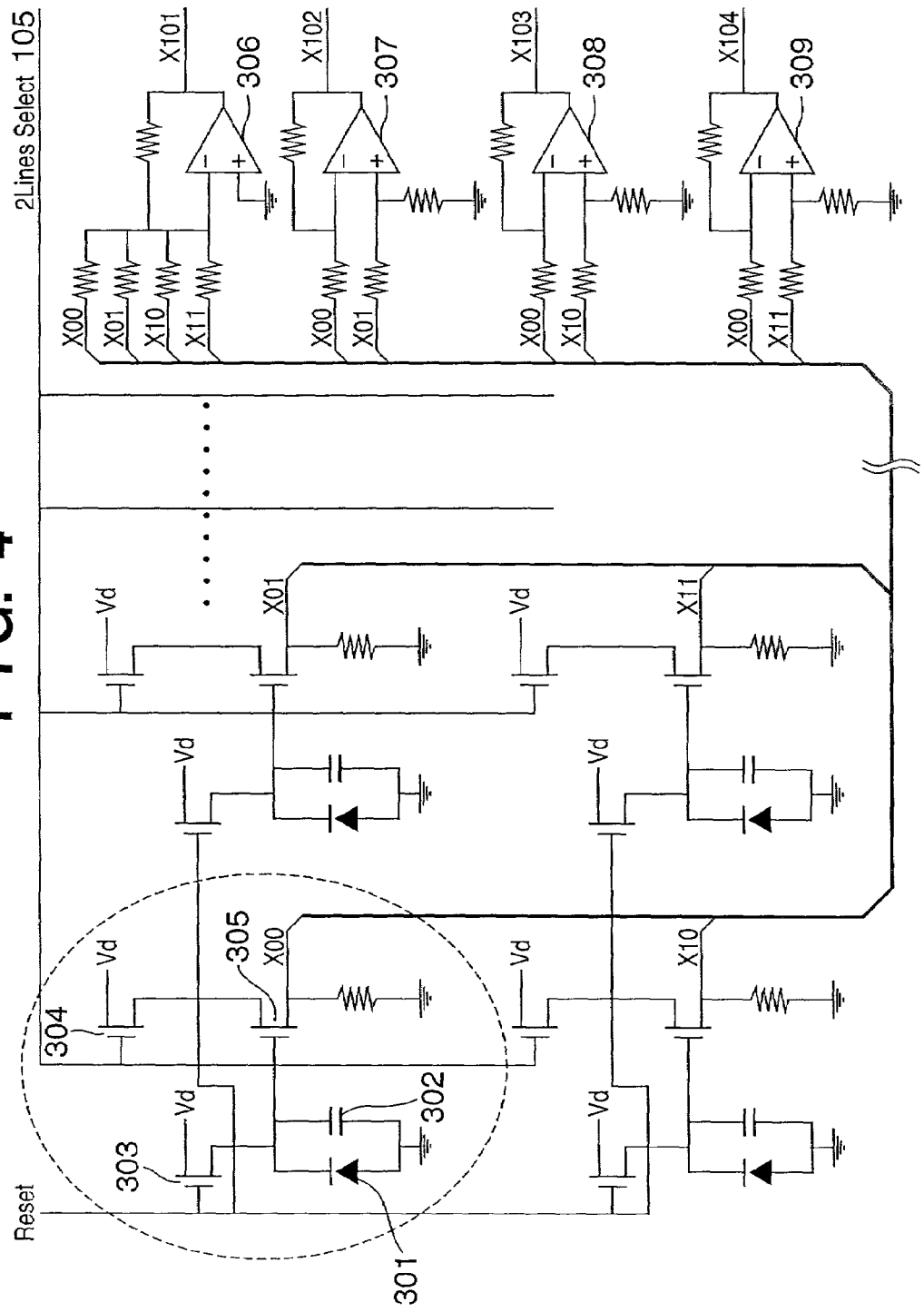
FIG. 4 is a diagram illustrating a circuit arrangement for implementing transform processing that is based upon a Haar transform equation according to a second embodiment of the present invention.

FIG. 4 is a diagram representing part of a flat-panel display formed on the same semiconductor substrate and illustrates a circuit arrangement for implementing transform processing based upon Equation (3) above. The arithmetic circuits 306 to 309 differ from those of FIG. 2 in that the adder circuits have been simplified. In this case, the reconstruction operation performed by the image reconstruction operational unit 38 implements Equation (4).

In addition, similar operations can be performed also using regular and inverse transforms, specifically:

$$X_{out} = H_3 X_{in}$$

where $$X_{out} \equiv \begin{bmatrix} X101 \\ X102 \\ X103 \\ X104 \end{bmatrix}, H = \begin{bmatrix} 1 & 1 & 1 & 1 \\ 0 & 1 & -1 & 0 \\ 0 & 0 & 1 & -1 \\ -1 & 0 & 0 & 1 \end{bmatrix}, X_{in} = \begin{bmatrix} X00 \\ X01 \\ X10 \\ X11 \end{bmatrix} \quad \text{(Eq. 5)}$$

$$X_{in} = \frac{1}{4} H_4 X_{out}$$

where $$X_{out} \equiv \begin{bmatrix} X101 \\ X102 \\ X103 \\ X104 \end{bmatrix}, H_4 = \begin{bmatrix} 1 & -1 & -2 & -3 \\ 1 & 3 & 2 & 1 \\ 1 & -1 & 2 & 1 \\ 1 & -1 & -2 & 1 \end{bmatrix}, X_{in} = \begin{bmatrix} X00 \\ X01 \\ X10 \\ X11 \end{bmatrix} \quad \text{(Eq. 6)}$$

THIRD EMBODIMENT

In each of the above embodiments, simple addition or subtraction is performed by the analog arithmetic units. However, if the resistance values used in the arithmetic circuits 306 to 309 can be made accurate, a weighting operation also is possible. Accordingly, it is also possible to employ so-called 5-3-type wavelet transforms, for example, which usually used in the art.

Thus, in accordance with the embodiments as described above, image information is output upon being separated into a component that includes a local mean value and components that do not include a local mean value, using a plurality of neighboring pixels as a basic unit, in an operation performed on pixels output from a flat-panel sensor, and the number of bits output by an A/D conversion applied to these items of image information can be changed, thereby making it possible to reduce the amount of data. Further, in display of a moving image sequence or the like, only the component that includes the local mean value is used and it is possible to subsequently reconstruct high-resolution image information as necessary.

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the first to fourth embodiments as described above, amount of data can be reduced and, at the same time, it is it possible to reconstruct high-resolution image information.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a plurality of energy transducers;
   an arithmetic circuit for generating a plurality of converted signals by applying processing to signals from each of a prescribed number of neighboring ones of said energy transducers, said prescribed number of neighboring energy transducers constituting a unit block;
   an output circuit for outputting the converted signals generated by said arithmetic circuit; and,
   a plurality of A/D converters,
   wherein said plurality of energy transducers, said arithmetic circuit and said output circuit are formed on the same semiconductor substrate; and
   the plurality of converted signals generated by said arithmetic circuit include a first converted signal generated by adding signals obtained from said unit block, and a second converted signal that includes differences between signals obtained from said unit block; and
   wherein said A/D converters convert the first and second converted signals, which are output by said output circuit, to digital data, wherein the number of bits of digital data of the first converted signal is greater than the number of bits of digital data of the second converted signal.

2. The apparatus according to claim 1, wherein said output circuit outputs the first converted signal and the second converted signal simultaneously.

3. The apparatus according to claim 1, wherein said output circuit outputs the first converted signal and the second converted signal sequentially.

4. The apparatus according to claim 1, wherein the processing executed by said arithmetic circuit is a wavelet transform or a Haar-function operation.

5. The apparatus according to claim 1, further comprising a display controller for causing a moving image sequence to be displayed based upon the first converted signal.

6. The apparatus according to claim 1, further comprising:
   reconstruction circuit for reconstructing outputs from individual ones of said energy transducers by executing an operation that is the inverse of an operation performed by said arithmetic circuit; and
   still-image processing circuit for executing still-image processing based upon the reconstructed signals.

7. The apparatus according to claim 6, wherein processing by said arithmetic circuit is executed by $$X_{out} = HX_{in}$$

where the following holds:

$$X_{out} \equiv \begin{bmatrix} X101 \\ X102 \\ X103 \\ X104 \end{bmatrix}, H = \begin{bmatrix} 1 & 1 & 1 & 1 \\ 1 & 1 & -1 & -1 \\ 1 & -1 & 1 & -1 \\ 1 & -1 & -1 & 1 \end{bmatrix}, X_{in} = \begin{bmatrix} X00 \\ X01 \\ X10 \\ X11 \end{bmatrix}$$

and
an inverse operation by said reconstruction circuit is executed by $$X_{in} = \frac{1}{4}HX_{out}.$$

8. The apparatus according to claim 6, wherein processing by said arithmetic circuit is executed by $$X_{out} = H_1 X_{in}$$

where the following holds:

$$X_{out} \equiv \begin{bmatrix} X101 \\ X102 \\ X103 \\ X104 \end{bmatrix}, H_1 = \begin{bmatrix} 1 & 1 & 1 & 1 \\ 1 & -1 & 0 & 0 \\ 1 & 0 & -1 & 0 \\ 1 & 0 & 0 & -1 \end{bmatrix}, X_{in} = \begin{bmatrix} X00 \\ X01 \\ X10 \\ X11 \end{bmatrix}$$

and
an inverse operation by said reconstruction circuit is executed by $$X_{in} = \frac{1}{4}H_2 X_{out}$$

where the following holds:

$$X_{out} \equiv \begin{bmatrix} X101 \\ X102 \\ X103 \\ X104 \end{bmatrix}, H_2 = \begin{bmatrix} 1 & 1 & 1 & 1 \\ 1 & -3 & 1 & 1 \\ 1 & 1 & -3 & 1 \\ 1 & 1 & 1 & -3 \end{bmatrix}, X_{in} = \begin{bmatrix} X00 \\ X01 \\ X10 \\ X11 \end{bmatrix}.$$

9. A sensing control method for controlling an image sensing apparatus having an image sensing device formed on the same semiconductor substrate and including a plurality of energy transducers and a processing circuit for applying processing to signals from the plurality of energy transducers, said method comprising:
an arithmetic step of generating a plurality of converted signals by the processing circuit by applying processing to signals from each of a prescribed number of neighboring ones of the energy transducers, said prescribed number of neighboring energy transducers constituting a unit block;
an output step of outputting the converted signals generated by said arithmetic step,
wherein the plurality of converted signals generated by said arithmetic step include a first converted signal generated by adding signals obtained from said unit block, and a second converted signal that includes differences between signals obtained from said unit block; and
an A/D converting step of converting the first and second converted signals, which are output by said output circuit, to digital data, wherein the number of bits of digital data of the first converted signal is greater than the number of bits of digital data of the second converted signal.

10. The apparatus according to claim 6, wherein processing by said arithmetic circuit is executed by $$X_{out} = H_3 X_{in}$$

where the following holds:

$$X_{out} \equiv \begin{bmatrix} X101 \\ X102 \\ X103 \\ X104 \end{bmatrix}, H = \begin{bmatrix} 1 & 1 & 1 & 1 \\ 0 & 1 & -1 & 0 \\ 0 & 0 & 1 & -1 \\ -1 & 0 & 0 & 1 \end{bmatrix}, X_{in} = \begin{bmatrix} X00 \\ X01 \\ X10 \\ X11 \end{bmatrix}$$

and
an inverse operation by said reconstruction circuit is executed by $$X_{in} = \frac{1}{4}H_4 X_{out}$$

where the following holds:

$$X_{out} \equiv \begin{bmatrix} X101 \\ X102 \\ X103 \\ X104 \end{bmatrix}, H_4 = \begin{bmatrix} 1 & -1 & -2 & -3 \\ 1 & 3 & 2 & 1 \\ 1 & -1 & 2 & 1 \\ 1 & -1 & -2 & 1 \end{bmatrix}, X_{in} = \begin{bmatrix} X00 \\ X01 \\ X10 \\ X11 \end{bmatrix}.$$

* * * * *